US012587897B2

(12) United States Patent
Kang et al.

(10) Patent No.: US 12,587,897 B2
(45) Date of Patent: Mar. 24, 2026

(54) APPARATUS AND METHOD FOR PROVIDING TIME SENSITIVE COMMUNICATION MANAGEMENT INFORMATION IN A WIRELESS COMMUNICATION SYSTEM

(71) Applicant: ELECTRONICS AND TELECOMMUNICATIONS RESEARCH INSTITUTE, Daejeon (KR)

(72) Inventors: Yoo Hwa Kang, Daejeon (KR); Seung Han Choi, Daejeon (KR); Changki Kim, Daejeon (KR); Jeoung Lak Ha, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 390 days.

(21) Appl. No.: 18/144,324

(22) Filed: May 8, 2023

(65) Prior Publication Data

US 2024/0080705 A1     Mar. 7, 2024

(30) Foreign Application Priority Data

| May 6, 2022 | (KR) | ...................... | 10-2022-0056166 |
| Jan. 9, 2023 | (KR) | ...................... | 10-2023-0003104 |
| May 8, 2023 | (KR) | ...................... | 10-2023-0059190 |

(51) Int. Cl.
    *H04W 28/02*        (2009.01)
    *H04L 47/80*        (2022.01)
(52) U.S. Cl.
    CPC ....... *H04W 28/0268* (2013.01); *H04L 47/801* (2013.01); *H04L 47/808* (2013.01)

(58) Field of Classification Search
    None
    See application file for complete search history.

(56) References Cited

U.S. PATENT DOCUMENTS

| 2022/0095153 A1 | 3/2022 | Ha et al. |
| 2022/0149964 A1 | 5/2022 | Kang et al. |

(Continued)

FOREIGN PATENT DOCUMENTS

| CN | 114205866 A | * | 3/2022 |
| GR | 20220100074 | * | 1/2022 |

(Continued)

OTHER PUBLICATIONS

3GPP TS 23.501. System architecture for the 5G System (5GS); Stage 2 (Release 17). Mar. 2022 (Year: 2022).*

(Continued)

*Primary Examiner* — Andre Tacdiran
(74) *Attorney, Agent, or Firm* — LRK PATENT LAW FIRM

(57) ABSTRACT

Provided is an operation method of a user plane function (UPF) apparatus in a wireless communication system, the operation method including: obtaining a subscription request message from either a TSN AF or a TSCTSF or both on the basis of an exposure service for a UPF event, the subscription request message including TSC management information; performing triggering for subscription to the UPF event on the basis of the TSC management information; and providing a notification message to either the TSN AF or the TSCTSF or both, the notification message including the TSC management information.

8 Claims, 11 Drawing Sheets

(56)　　　　　　References Cited

U.S. PATENT DOCUMENTS

2025/0119851 A1 *　4/2025　Speicher ............. H04W 56/001
2025/0212142 A1 *　6/2025　Chandramoul ..... H04W 56/001

FOREIGN PATENT DOCUMENTS

KR　　　　10-2186277　B1　12/2020
KR　　10-2022-0138829　A　10/2022

OTHER PUBLICATIONS

3GPP, "3rd Generation Partnership Project; Technical Specification Group Services and System Aspects; Study on UPF enhancement for Exposure and SBA (Release 18)", 3GPP TR 23.700-62 V0.2.0 (Apr. 2022).
3rd Generation Partnership Project; Technical Specification Group Services and System Aspects; Study on UPF enhancement for Exposure and SBA (Release 18), 3GPP TR 23.700-62 V0.2.0 (Apr. 2022.).

* cited by examiner

FIG. 2

| Attribute | Description | Comment |
|---|---|---|
| User plane node Management Information Container | 5GS TSN Bridge information exchanged transparently between NW-TT and TSN AF or TSCTSF via 5GS (as in Table 5.28.3.1-2). | |
| Port Management Information Container | Information exchanged transparently between NW-TT and TSN AF or TSCTSF via 5GS (as in Table 5.28.3.1-1). | |
| NW-TT Port Number | NW-TT Port Number related to the PMIC | Included when the PMIC information is present. |

FIG. 3

| Service Name | Description | Example Consumer(s) |
|---|---|---|
| Nupf_EventExposure | This UPF service provide the support for event exposure. | TSN AF, TSCTSF |

FIG. 5

| • Ethernet port management related | | | | |
|---|---|---|---|---|
| • Port number | Port number for which Port Management Information Container is provided. | Yes | PDU Session | New |
| • Port Management Information Container | Includes Ethernet port management information | Yes | PDU Session | New |
| • User plane node Management Information Container | Includes User plane node management information | Yes | | New |
| • Reporting frequency | Defines the frequency for the reporting, such as event triggered, periodic, or when the PDU Session is released. | Yes | PDU Session | New |
| • Target of reporting | Defines the target of the TSC management information reports, it can be the TSN AF or TSCTSF. | Yes | PDU Session | New |
| • Indication of direct event notification | Indicates that the TSC management information event shall be reported by the UPF directly to the NF indicated by the Target of reporting. | Yes | PDU Session | New |

FIG. 7

| Attribute | Description | Comment |
|---|---|---|
| User plane node Management Information Container | 5GS TSN Bridge information exchanged transparently between NW-TT and TSN AF or TSCTSF via 5GS (as in Table 5.28.3.1-2). | |
| Port Management Information Container | Information exchanged transparently between NW-TT and TSN AF or TSCTSF via 5GS (as in Table 5.28.3.1-1). | |
| NW-TT Port Number | NW-TT Port Number related to the PMIC. | Included when the PMIC information is present. |
| Indication of event notification (NOTE) | Indicates that the UPF directly reports the information via Nupf_EventExposure_Notify service operation. | Included when the TSN AF or TSCTSF subscribes for TSN/TSC events to the PCF. |

NOTE:     The TSC Management Information may contain the Indication of event notification. The Indication of event notification includes a Notification Target Address that identifies the recipient of the information being notified by the UPF (TSNAF/TSCTSF). The Indication of local event notification also indicates that the UPF reports the information via Nupf_EventExposure_Notify service operation.

APPARATUS AND METHOD FOR PROVIDING TIME SENSITIVE COMMUNICATION MANAGEMENT INFORMATION IN A WIRELESS COMMUNICATION SYSTEM

CROSS REFERENCE TO RELATED APPLICATIONS

The present application claims priority to Korean Patent Application No. 10-2022-0056166, filed 6 May 2022, Korean Patent Application No. 10-2023-0003104, filed 9 Jan. 2023, and Korean Patent Application No. 10-2023-0059190, filed 8 May 2023, the entire contents of which are incorporated herein for all purposes by this reference.

BACKGROUND OF THE INVENTION

1. Field of the Invention

The present disclosure relates to a wireless communication system technology. More particularly, the present disclosure relates to a UPF event exposure method for forwarding time-sensitive communication (TSC) management information in the technical field of supporting a user plane function (UPF) service based interface (SBI).

2. Description of Related Art

A 3GPP 5G system supports an SBI, but a UPF currently does not support an SBI and uses an N4 (a reference point between an SMF and the UPF) interface between the SMF and the UPF. However, in the case of a QoS monitoring report transmitted by a UPF, 3GPP TS 29.244 standard has newly defined that an event notification is forwarded to a local NEF/AF using a Nupf_EventExposure_Notify service operation.

In 3GPP Rel-18 TR 23.700-62 (FS_UPEAS: Study on UPF enhancement for Exposure and SBA (Release 18)), the development of a standard technology for a UPF event exposure service has begun and solutions therefor have been proposed. This means that a UPF supports an SBI and an event exposure service is provided.

Currently, analytic information for an NWDAF, and QoS monitoring information have been considered as a UPF event exposure service. The present disclosure proposes a method of providing TSC information using the UPF event exposure service. Currently, in 3GPP TS 23.501, TSC management information is defined through predetermined information. The TSC management information is configured as a TSC management information container and includes an UM IC, a PMIC, and an NW-TT port number.

The foregoing is intended merely to aid in the understanding of the background of the present disclosure, and is not intended to mean that the present disclosure falls within the purview of the related art that is already known to those skilled in the art.

SUMMARY OF THE INVENTION

The present disclosure is directed to providing a method of using UPF event exposure to efficiently and directly forward TSC management information between a 5G system TSN AF/TSCTSF and UPF/NW-TT without passing through intermediate functions.

According to an embodiment of the present disclosure, there is provided an operation method of a user plane function (UPF) apparatus in a wireless communication system, the operation method including: obtaining a subscription request message from either a TSN AF or a TSCTSF or both on the basis of an exposure service for a UPF event, the subscription request message including TSC management information; performing triggering for subscription to the UPF event on the basis of the TSC management information; and providing a notification message to either the TSN AF or the TSCTSF or both, the notification message including the TSC management information.

In addition, the operation method may further include using the TSC management information as a new UPF event, wherein the notification message may include a PMIC(s), a UNIX, and a related NW-TT port number.

In addition, the subscription request message may be a message for requesting subscription or unsubscription to the UPF event.

In addition, the subscription request message may be provided on the basis of a first operation for the exposure service for the UPF event, and the notification message may be provided on the basis of a second operation for the exposure service for the UPF event, and the first operation may include Nupf_EventExposure_Subscribe and Nupf_EventExposure_UnSubscribe, and the second operation may include Nupf_EventExposure_Notify.

In addition, the operation method may further include: obtaining the TSC management information from the TSN AF/TSCTSF; in response to the obtaining of the TSC management information, providing, the TSN AF/TSCTSF with a request message for subscription or unsubscription to the UPF event; and obtaining the notification message from the TSN AF/TSCTSF.

According to an embodiment of the present disclosure, there is provided a user plane function (UPF) apparatus in a wireless communication system, the UPF apparatus including: a transceiver; and at least one controller operably connected to the transceiver, wherein the at least one controller is configured to: obtain a subscription request message from either a TSN AF or a TSCTSF or both on the basis of an exposure service for a UPF event, the subscription request message including TSC management information; perform triggering for subscription to the UPF event on the basis of the TSC management information; and provide a notification message to either the TSN AF or the TSCTSF or both, and the notification message includes the TSC management information.

In addition, the at least one controller may be further configured to use the TSC management information as a new UPF event, and the notification message may include a PMIC(s), a UNIX, and a related NW-TT port number.

In addition, the subscription request message may be a message for requesting subscription or unsubscription to the UPF event.

In addition, the subscription request message may be provided on the basis of a first operation for the exposure service for the UPF event, and the notification message may be provided on the basis of a second operation for the exposure service for the UPF event, and the first operation may include Nupf_EventExposure_Subscribe and Nupf_EventExposure_UnSubscribe, and the second operation may include Nupf_EventExposure_Notify.

In addition, the at least one controller may be further configured to: obtain the TSC management information from the TSN AF/TSCTSF; in response to the obtaining of the TSC management information, provide the TSN AF/TSCTSF with a request message for subscription or unsubscription to the UPF event; and obtain the notification message from the TSN AF/TSCTSF.

Using the UPF event exposure service of the present disclosure enables direct forwarding between the TSN AF/TSCTSF and the UPF/NW-TT without passing through unnecessary intermediate nodes.

BRIEF DESCRIPTION OF THE DRAWINGS

The above and other objectives, features, and other advantages of the present disclosure will be more clearly understood from the following detailed description when taken in conjunction with the accompanying drawings, in which:

FIG. 2 is a diagram illustrating TSC management information defined in 3GPP TS 23.501;

FIG. 3 is a diagram illustrating a new TSC management information event for a UPF event exposure service in a wireless communication system according to an embodiment of the present disclosure;

FIG. 5 is a diagram illustrating parameters included in TSN management information, according to an embodiment of the present disclosure;

FIG. 7 is a diagram illustrating TSC management information that an SMF forwards to a UPF, according to an embodiment of the present disclosure;

DETAILED DESCRIPTION OF THE INVENTION

Figure 1:
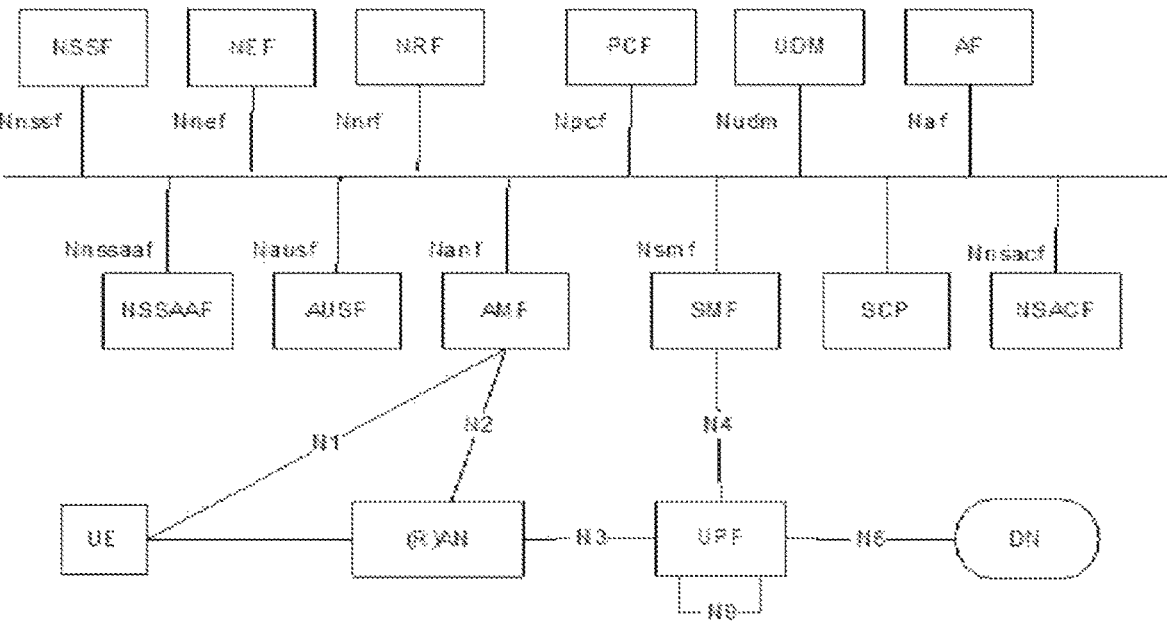
FIG. 1 is a diagram illustrating an architecture of a wireless communication system according to an embodiment of the present disclosure.

The expression "according to some embodiments" or "according to an embodiment" used throughout the specification does not necessarily indicate the same embodiment.

Some embodiments of the present disclosure may be described into functional block components and various processing steps. Some or all of the functional blocks may be realized as any number of hardware and/or software components performing specific functions. For example, functional blocks of the present disclosure may be realized by one or more microprocessors or by circuit components for a predetermined function. In addition, for example, the functional blocks of the present disclosure may be realized in various programing or scripting languages. The functional blocks may be realized as an algorithm running on one or more processors. In addition, the present disclosure may employ conventional techniques for electronic environment setting, signal processing, and/or data processing. The terms "mechanism", "element", "means", and "component" may be widely used, and are not limited to mechanical and physical components.

Furthermore, connecting lines or connecting members between constituent elements shown in the drawings are merely illustrative of functional connections and/or physical or circuit connections. Connections between constituent elements may be represented by various alternative or additional functional connections, physical connections, or circuit connections in a practical device.

In order to achieve the above objective, the present disclosure defines a UPF event exposure service operation and a UPF event in order to enable direct forwarding between a TSN AF/TSCTSF and a UPF/NW-TT, and provides a UPF event exposure service procedure for registering, releasing, and giving notification of the defined UPF event.

Herein, a time-sensitive network (TSN) is a network that provides real-time communication for control and data plane traffic. A time-sensitive network application function (TSN AF) is a function within a TSN network used to support a particular application requiring real-time communication. A time-sensitive communication time synchronization function (TSCTSF) is part of a TSN technology for synchronizing time across various parts of a network to ensure accurate communication. A user plane function (UPF) is an element of a cellular network that provides user plane transport for control and user data. A network-side TSN translator (NW-TT) is a technology that converts network-side traffic between different TSN networks to ensure compatibility and smooth communication.

In addition, a UPF event exposure service may be a service that exposes an event occurring within a UPF provided by the UPF of a network. This service allows information on the event to be transmitted directly between different elements, such as a TSN AF/TSCTSF and a UPF/NW-TT, of a network. A UPF event exposure service operation may be defined as registration, release, and notification procedures for the event.

In 3GPP Rel-16/17, there is no way to directly forward TSC management information between a TSN AF/TSCTSF and a UPF/NW-TT, so TSC management information is forwarded in the form of a container, passing through a PCF and an SMF. This may lead to unnecessary transmittion by intermediate functions, such as the PCF and the SMF, which use the TSC management information. Therefore, the present disclosure proposes a technology of using UPF event exposure in order to directly forward the TSC management information between the TSN AF/TSCTSF and the UPF/NW-TT.

The above technical features of the present disclosure will be described below in more detail with reference to the accompanying drawings.

FIG. 1 is a diagram illustrating an architecture of a wireless communication system according to an embodiment of the present disclosure.

In 3GPP Rel-18 TR 23.700-62 (FS_UPEAS: Study on UPF enhancement for Exposure and SBA (Release 18)), development of a standard technology for a UPF event exposure service has begun and solutions therefor have been proposed. This means that a UPF supports an SBI and an event exposure service is provided. Currently, analytic information for an NWDAF, and QoS monitoring information have been considered as a UPF event exposure service. The present disclosure proposes a method of providing TSC information using the UPF event exposure service.

FIG. 2 is a diagram illustrating TSC management information defined in 3GPP TS 23.501.

TSC management information is configured as a TSC management information container and includes an UMIC, a PMIC, and an NW-TT port number. The details of the configuration included in the TSC management information will be described later with reference to FIG. 5.

In 3GPP Rel-16/17, there is no way to directly forward TSC management information between a TSN AF/TSCTSF and a UPF/NW-TT, so TSC management information is forwarded in the form of a container, passing through a PCF and an SMF. This may lead to unnecessary transmittion by intermediate functions, such as the PCF and the SMF, which use the TSC management information. Therefore, the present disclosure proposes a method of using UPF event exposure in order to directly forward the TSC management information between the TSN AF/TSCTSF and the UPF/NW-TT. The present disclosure proposes a method of using UPF event exposure to efficiently and directly forward TSC management information between a 5G system TSN AF/TSCTSF and UPF/NW-TT without passing through intermediate functions.

FIG. 3 is a diagram illustrating a new TSC management information event for a UPF event exposure service in a wireless communication system according to an embodiment of the present disclosure.

Operations that a Nupf_EventExposure service provides may include the following three, and examples of the consumers that may subscribe are a TSN AF and a TSCTSF.

Nupf_EventExposure_Subscribe.

Nupf_EventExposure_UnSubscribe.

Nupf_EventExposure_Notify.

The present disclosure defines a new TSC management information event, and a notification of the event may be transmitted by a UPF to a TSN AF or a TSCTSF. Herein, a UPF event notification may include TSC management information (a PMIC(s), an UM IC, and an NW-TT port number).

A TSN AF/TSCTSF subscribes to a TSC management information event through a UPF, and when a change in PMIC or UMIC content occurs in the UPF, the UPF may transmit an event notification to the TSN AF/TSCTSF. Thus, the TSN AF/TSCTSF may receive changed TSC management information through the event notification.

When even the TSN AF/TSCTSF provides TSC management information as an event exposure service similarly to the UPF, the UPF may perform event registration and release for the TSC management information and the TSN AF/TSCTSF may directly forward the TSC management information as an event notification, in a reverse manner.

Figure 4A:
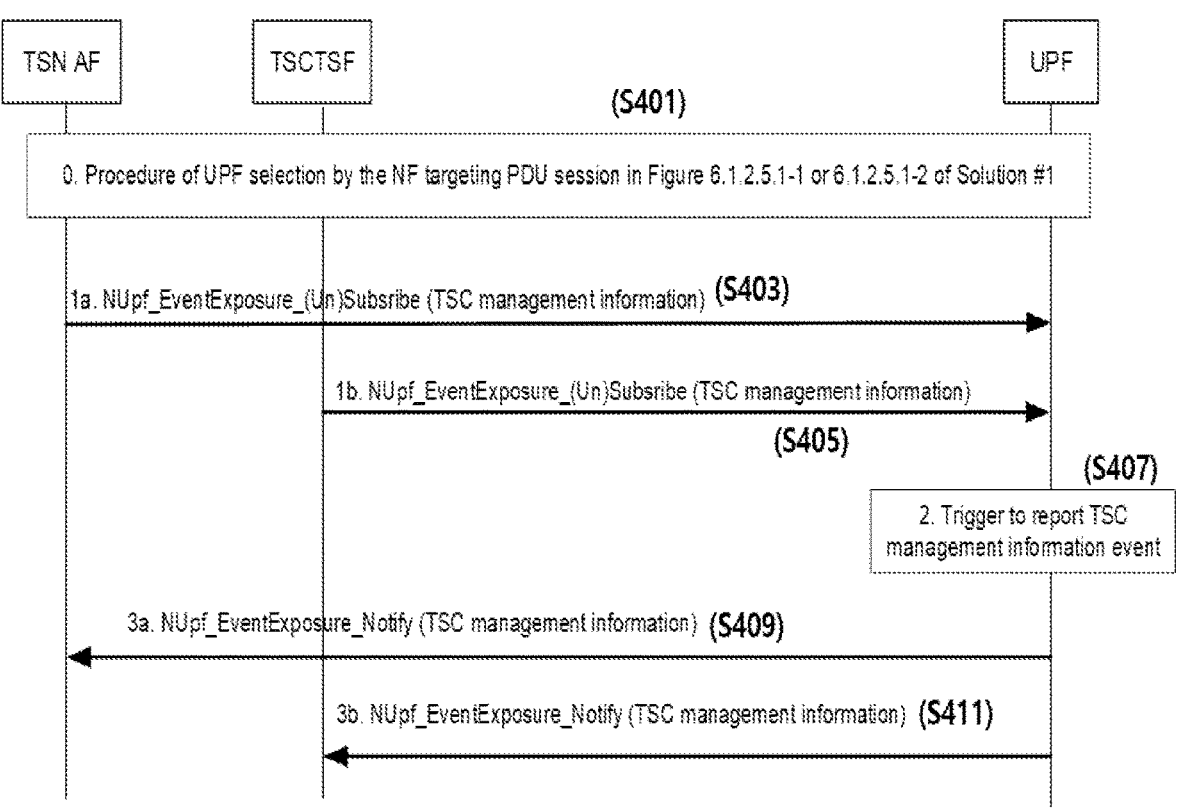
FIG. 4A is a diagram illustrating a procedure of using a UPF event exposure service to forward TSC management information in a wireless communication system according to an embodiment of the present disclosure.

FIG. 4A is a diagram illustrating a procedure of using a UPF event exposure service to forward TSC management information in a wireless communication system according to an embodiment of the present disclosure.

Currently, a UPF is selected for a PDU session that provides a TSC service, and even a TSN AF or a TSCTSF may be aware of the PDU session. Therefore, the UPF servicing the PDU session may be found using a procedure for Solution #1 defined in 3GPP TR 23.700-62. The TSN AF/TSCTSF that has found the UPF forwards a Nupf_EventExposure_(Un)scribe service operation to the UPF to subscribe to a TSC management information event. When UM IC/PMIC content changes in the UPF/NW-TT, the UPF may forward an event notification to the TSN AF/TSCTSF using a Nupf_EventExposure_Notify service operation.

More specifically, the operations of FIG. 4A may be performed according to the steps below.

In step S401, at least one selected from the group of the TSN AF, the TSCTSF, and the UPF may perform a procedure for UPF selection.

In step S403, the TSN AF may provide the UPF with a subscription/unsubscription message for event exposure. Herein, the subscription/unsubscription message may include, for example, Nupf_EventExposure_(Un)scribe. In addition, the subscription/unsubscription message may include TSC management information.

In step S405, the TSCTSF may provide the UPF with a subscription/unsubscription message for event exposure. Herein, the subscription/unsubscription message may include, for example, Nupf_EventExposure_(Un)scribe. In addition, the subscription/unsubscription message may include TSC management information.

In step S407, the UPF may report the TSC management information to trigger an event.

In step S409, the UPF may provide the TSN AF with a notification message for event exposure. The notification message may include, for example, Nupf_EventExposure_Notify. In addition, the notification message may include the TSC management information.

In step S411, the UPF may provide the TSCTSF with a notification message for event exposure. The notification message may include, for example, Nupf_EventExposure_Notify. In addition, the notification message may include the TSC management information.

Figure 4B:
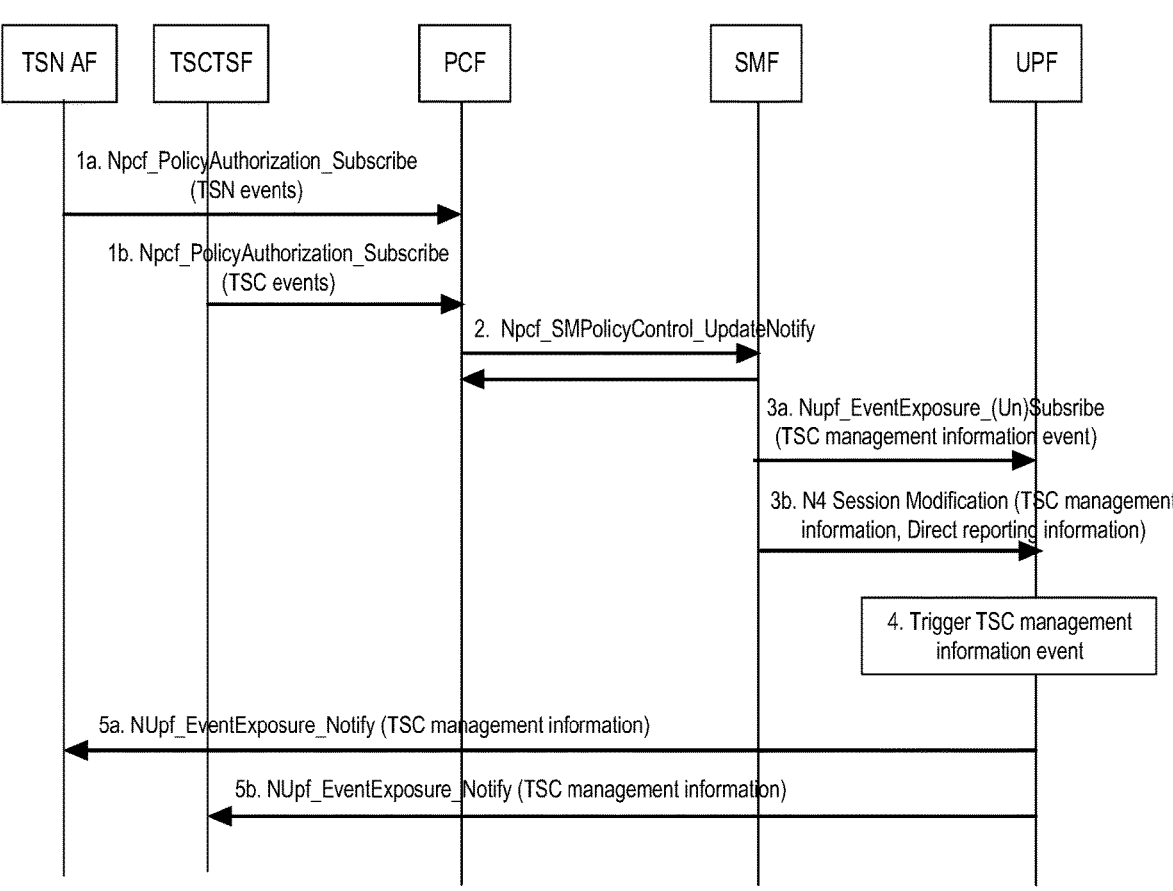
FIG. 4B is a diagram illustrating a procedure of using a UPF event exposure service to forward TSC management information in a wireless communication system according to another embodiment of the present disclosure.

FIG. 4B is a diagram illustrating a procedure of using a UPF event exposure service to forward TSC management information in a wireless communication system according to another embodiment of the present disclosure.

A TSN AF/TSCTSF may use a Npcf_PolicyAuthorization service in the same way according to the standard to forward TSC management information to a PCF or subscribe to a TSC event. According to the current standard method, the PCF and an SMF may use a Npcf_SMPolicyControl service to forward TSC management information therebetween. When the SMF receives a request for a TSC management information event through the PCF, a Nupf_EventExposure_(Un)scribe service operation is used or an N4 interface extended for a TSC event request is used to subscribe to the TSC management information event through a UPF. When UMIC/PMIC content changes in the UPF/NW-TT, the UPF may use a Nupf_EventExposure_Notify service operation to directly forward an event notification to the TSN AF/TSCTSF.

FIG. 5 is a diagram illustrating parameters included in TSN management information among PDU session-related policy information, according to an embodiment of the present disclosure.

According to 3GPP TR 23.700-62 (Rel-18), when an NF (e.g., a time-sensitive networking application function (TSN AF), time-sensitive communication time synchronization function (TSCTSF)) request TSC management information as an event, a UPF needs to be able to directly forward the TSC management information to the NF as an event exposure notification. Therefore, a UPF according to an embodiment of the present disclosure may provide TSC management information as an event exposure service.

According to the 3GPP standards, TSC management information that is forwarded by a TSN AF to a PCF and is finally forwarded to a UPF may include a PMIC, a port number, and a UNIX as follows.

A port management information container (PMIC)

A port number

A user plane node management information container (UNIX)

According to an embodiment of the present disclosure, the TSC management information forwarded to the UPF may further include an event reporting method (frequency), a target of reporting an event (destination NF address), and an indication of direct event notification as follows.

The indication of direct event notification may be an indication requesting a direct event notification so that the UPF performs direct forwarding to the NF as a UPF event notification.

1. Frequency of reporting (event triggered, periodic, or when the PDU Session is released):

2. Optionally, target of reporting (i.e., the NEF, the AF or the Local NEF, indicated as Notification Target Address+Notification Correlation ID);

3. Optionally, an indication of direct event notification (to request the UPF to directly send TSC management information reports to the TSN AF as described in clause X.X of TS 23.502 [3]).

That is, FIG. 5 shows the addition of the above three additional parameters to the PDU session-related policy information defined in 3GPP TS 23.503.

Figure 6:
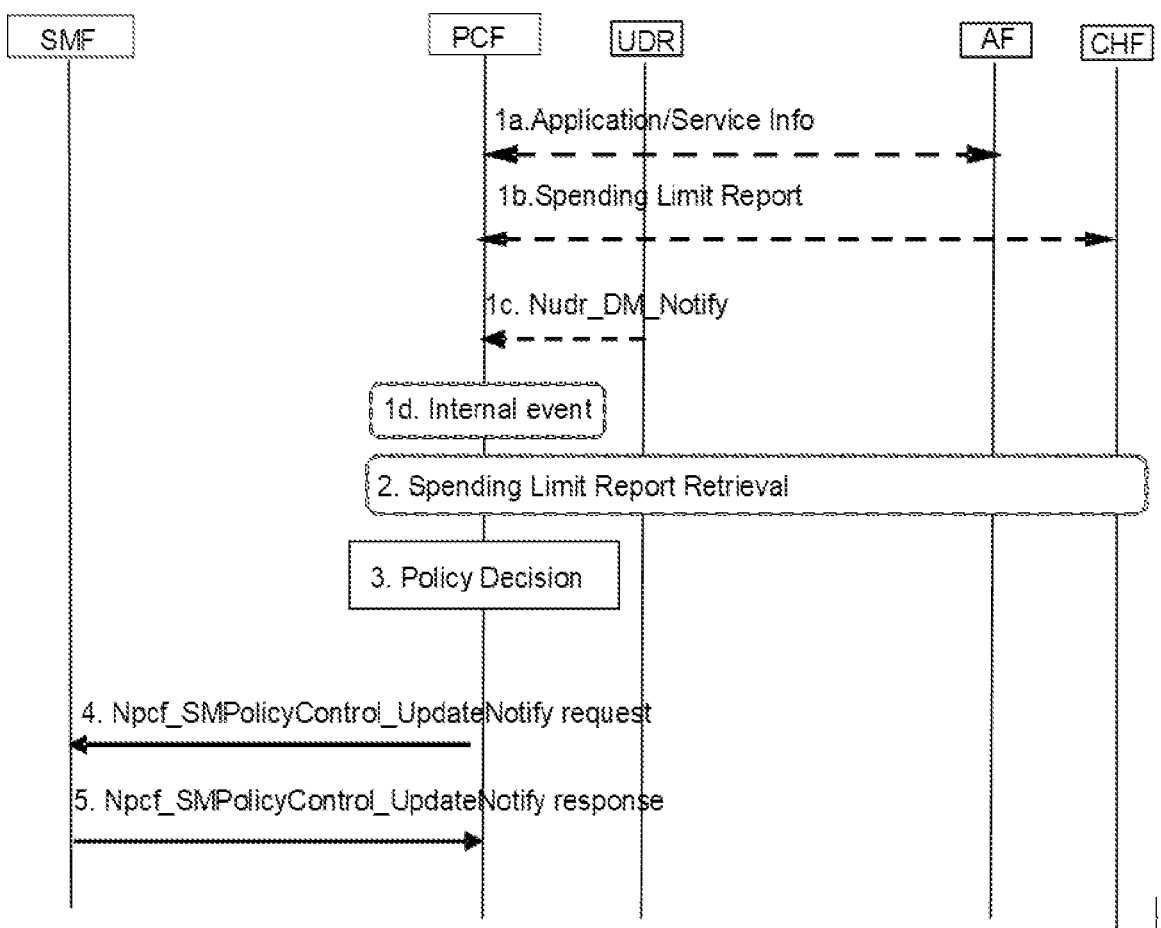
FIG. 6 is a diagram illustrating a procedure in which a PCF requests an SMF to modify policy information when the policy information changes, according to an embodiment of the present disclosure.

FIG. 6 is a diagram illustrating a procedure in which a PCF requests an SMF to modify policy information when the policy information changes, according to an embodiment of the present disclosure.

When a TSN AF forwards TSC management information to a UPF, the procedure of FIG. 4A or 4B may be followed.

Specifically, in step S610 of FIG. 6, a TSN AF forwards TSC management information to a PCF, and the PCF uses a Npcf_SMPolicyControl_UpdateNotify service operation in step S630 to forward changed policy information to an SMF. The changed TSC management information is forwarded using the Npcf_SMPolicyControl_UpdateNotify service operation, and the PDU session-related policy information defined in FIG. 5 may be forwarded as input parameters. Therefore, the three parameters newly defined in FIG. 5 for a UPF event notification may also be forwarded from the PCF to the SMF.

In step S610 of FIG. 6, the TSN AF may use a Npcf_PolicyAuthorization service interface to forward the TSC management information to the PCF. Accordingly, the present disclosure may define new parameters for a UPF event notification as input parameters of Npcf_PolicyAuthorization Create and Npcf_PolicyAuthorization Update service operations. The three parameters, (1) an event reporting method, (2) a target of reporting an event, and (3) an indication of direct event notification, defined above may be added as the input parameters of the Npcf_PolicyAuthorization Create and Npcf_PolicyAuthorization Update service operations.

Therefore, the Npcf_PolicyAuthorization Create and Npcf_PolicyAuthorization Update service operations forwarded by the TSN AF to the PCF may have the following parameters related to the TSC management information as input values. The present disclosure may add new three parameters, reporting frequency, a target of reporting, and an indication of local event notification.

A port management information container
A port number
A user plane node management information container
Reporting frequency
A target of reporting
An indication of local event notification FIG. 7 is a diagram illustrating TSC management information that an SMF forwards to a UPF, according to an embodiment of the present disclosure.

According to an embodiment of the present disclosure, an additional indication of event notification may be defined for a UPF event notification. A UPF that has received an indication of event notification including a notification destination (notification target) address through an N4 interface may use the notification destination address to directly transmit a UPF event notification to an NF (a TSN AF or a TSCTSF) that has requested an event.

Figure 8:
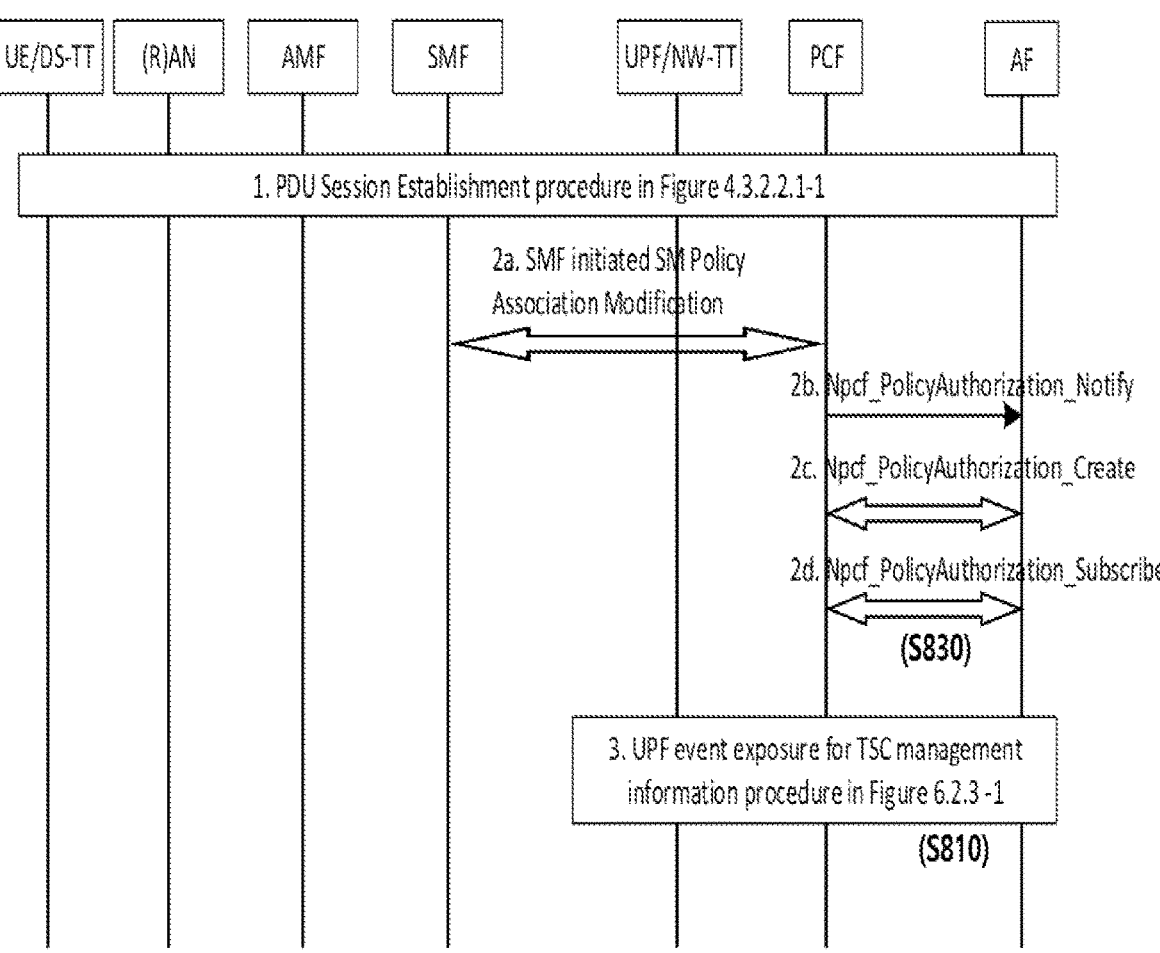
FIG. 8 is a diagram specifically illustrating a UPF event exposure procedure of FIG. 2.

FIG. 8 is a diagram specifically illustrating a UPF event exposure procedure of FIG. 2.

Referring to FIG. 8, in a bridge information reporting process, a UPF event exposure procedure may be used in step S810.

In step S830, a TSN AF/TSCTSF may subscribe to a PCF to receive a TSN/TSC event. Herein, the TSN AF/TSCTSF may perform a UPF event exposure service process proposed in 3GPP TR 23.700-62 Solution #2. Accordingly, the TSN AF/TSCTSF may directly subscribe to an event through a UPF, and the UPF may forward an event notification directly to the TSN AF/TSCTSF.

Figure 9:
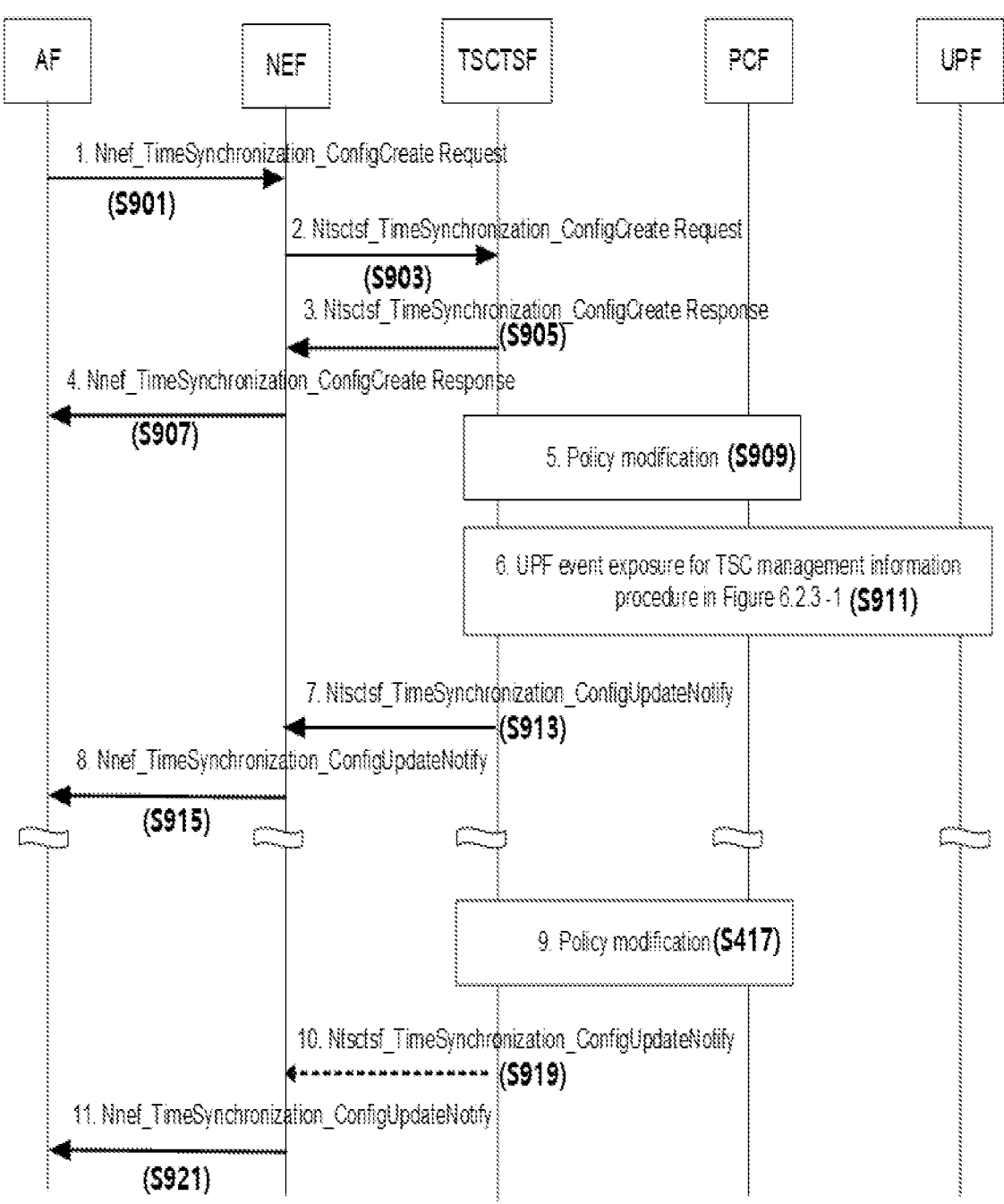
FIG. 9 is a diagram illustrating a time synchronization service activation process according to an embodiment of the present disclosure.

FIG. 9 is a diagram illustrating a time synchronization service activation process according to an embodiment of the present disclosure.

Referring to FIG. 9, the UPF event exposure procedure of FIG. 2 may be used in step S909 below.

In step S901, an AF provides a creation request message for time synchronization to an NEF. The creation request message may include, for example, a Nnef_TimeSynchronization_ConfigCreate Request.

In step S903, the NEF forwards a creation request message for time synchronization to a TSCTSF. The creation request message forwarded to the TSCTSF may include, for example, a Ntsctsf_TimeSynchronization_ConfigCreate Request.

In step S905, the NEF obtains a creation response message for time synchronization from the TSCTSF. The creation response message may include, for example, a Ntsctsf_TimeSynchronization_ConfigCreate Response.

In step S907, the NEF forwards a creation response message for time synchronization to the AF. The forwarded creation response message may include, for example, a Nnef_TimeSynchronization_ConfigCreate Response.

In step S909, either the TSCTSF or a PCF or both perform policy modification.

In step S911, at least one selected from a group of the TSCTSF, the PCF, and the UPF performs a UPF event exposure procedure on TSC management information.

In step S913, the TSCTSF provides an update notification message for time synchronization to the NEF. The update notification message may include, for example, a Ntsctsf_TimeSynchronization_ConfigUpdateNotify.

In step S915, the NEF forwards an update notification message to the AF. The forwarded update notification message may include, for example, a Nnef_TimeSynchronization_ConfigUpdateNotify.

In step S917, either the TSCTSF or the PCF or both perform policy modification.

In step S919, the TSCTSF provides an update notification message for time synchronization to the NEF. The update notification message may include, for example, a Ntsctsf_TimeSynchronization_ConfigUpdateNotify.

In step S921, the NEF forwards an update notification message to the AF. The forwarded update notification message may include, for example, a Nnef_TimeSynchronization_ConfigUpdateNotify.

In this way, in various service scenarios in which a TSN AF/TSCTSF subscribes to a TSN/TSC event through a PCF in 3GPP TS 23.502, the TSN AF/TSCTSF may use a UPF event exposure service to directly subscribe to an event from a UPF and receive an event notification.

Figure 10:
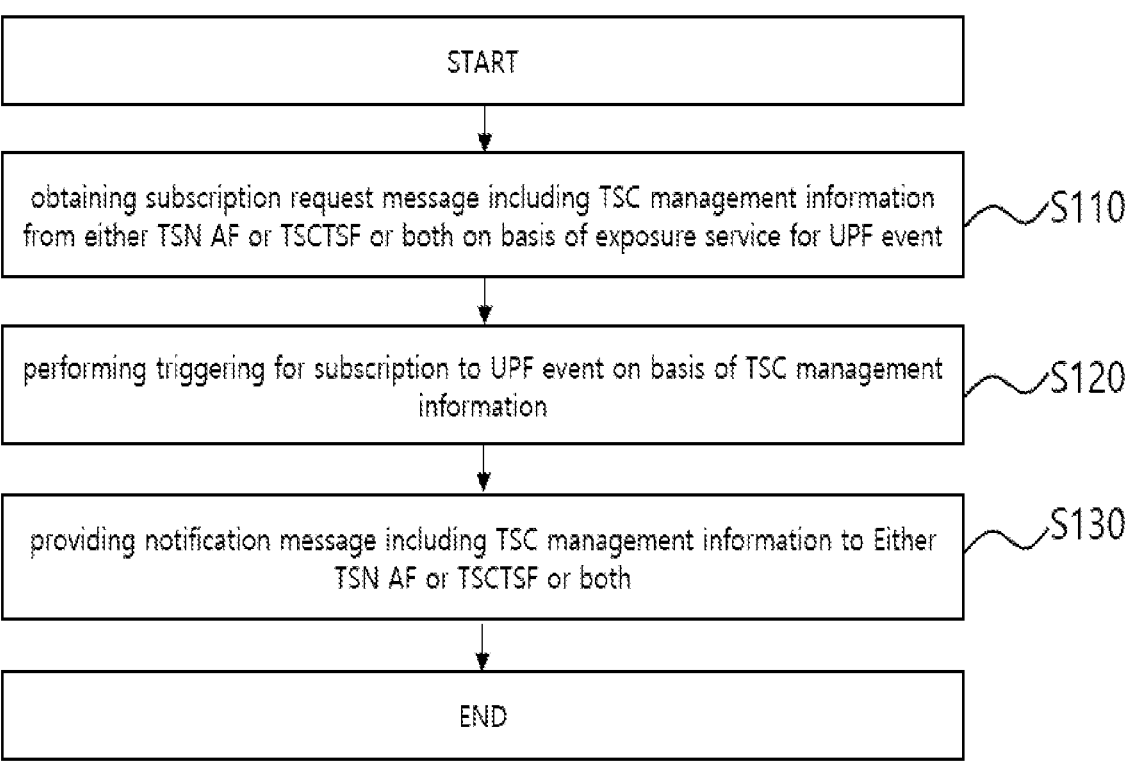
FIG. 10 is a flowchart illustrating an operation of a user plane function (UPF) apparatus in a wireless communication system according to an embodiment of the present disclosure.

FIG. 10 is a flowchart illustrating an operation of a user plane function (UPF) apparatus in a wireless communication system according to an embodiment of the present disclosure.

In step S110, a UPF obtains a subscription request message including TSC management information from either a TSN AF or a TSCTSF or both on the basis of an exposure service for a UPF event.

Herein, the subscription request message may be a message for requesting subscription or unsubscription to a UPF event.

In step S120, the UPF performs triggering for subscription to the UPF event on the basis of the TSC management information.

In step S130, the UPF provides a notification message including the TSC management information to either the TSN AF or the TSCTSF or both.

In addition, the subscription request message is provided on the basis of a first operation for the UPF event exposure service. The notification message is provided on the basis of a second operation for the UPF event exposure service. The first operation may include Nupf_EventExposure_Subscribe and Nupf_EventExposure_UnSubscribe. The second operation may include Nupf_EventExposure_Notify.

In addition, the UPF may further perform using the TSC management information as a new UPF event. Herein, the notification message may include a PMIC(s), a UM IC, and a related NW-TT port number.

In addition, the UPF may further perform: obtaining the TSC management information from the TSN AF/TSCTSF; in response to the obtaining of the TSC management information, providing the TSN AF/TSCTSF with a request message for subscription or unsubscription to the UPF event; and obtaining the notification message from the TSN AF/TSCTSF.

The embodiments of the present disclosure described above are not realized only through an apparatus and a method, and may be implemented through a program that executes functions corresponding to the configurations of the embodiments of the present disclosure or through a recording medium on which the program is recorded.

Although preferred embodiments of the present disclosure have been described for illustrative purposes, those skilled in the art will appreciate that various modifications, additions and substitutions are possible, without departing from the scope and spirit of the disclosure as disclosed in the accompanying claims.

Specific embodiments for implementing the present disclosure have been described. The present disclosure may include the above-described embodiments as well as embodiments simply changed in design or easily changed. In addition, the present disclosure may also include techniques easily modified using the embodiments and implemented. Therefore, the scope of the present disclosure should not be defined as being limited to the embodiments, but should be defined by the appended claims and equivalents thereof

What is claimed is:

1. An operation method of a user plane function (UPF) apparatus in a wireless communication system, the operation method comprising:
   obtaining a subscription request message from either a Time-Sensitive Networking Application Function (TSN AF) or a Time Sensitive Communication Time Synchronization Function (TSCTSF) or both on the basis of an exposure service for a UPF event, the subscription request message including Time-Sensitive Communication (TSC) management information;
   performing triggering for subscription to the UPF event on the basis of the TSC management information;
   providing a notification message to either the TSN AF or the TSCTSF or both, the notification message including the TSC management information;
   obtaining the TSC management information from the TSN AF or the TSCTSF;
   in response to the obtaining of the TSC management information, providing the TSN AF or the TSCTSF with a request message for subscription or unsubscription to the UPF event; and
   obtaining the notification message from the TSN AF or the TSCTSF.

2. The operation method of claim 1, further comprising using the TSC management information as a new UPF event,
   wherein the notification message includes a Port Management Information Container PMIC(s), a User Plane Node Management Information Container UMIC, and a related Network-Side TSN Translator NW-TT port number.

3. The operation method of claim 1, wherein the subscription request message is a message for requesting subscription or unsubscription to the UPF event, and
   the subscription request message for the UPF event includes at least one selected from a group of an event reporting method, a destination Network Function NF address for event reporting, and a request for direct event notification.

4. The operation method of claim 3, wherein the subscription request message is provided on the basis of a first operation for the exposure service for the UPF event,
   the notification message is provided on the basis of a second operation for the exposure service for the UPF event,
   the first operation includes Nupf_EventExposure Subscribe and
   Nupf_EventExposure_UnSubscribe, and is provided on the basis of an N4 interface between a Session Management Function SMF and the UPF, a Npcf_SMPolicyControl service interface between the SMF and a Policy Control Function PCF, and a Npof_PolicyAuthorization service interface between the TSN AF/TSCTSF and the PCF, and
   the second operation includes Nupf_EventExposure_Notify.

5. A user plane function (UPF) apparatus in a wireless communication system, the UPF apparatus comprising:
   a transceiver; and
   at least one controller operably connected to the transceiver,
   wherein the at least one controller is configured to:
   obtain a subscription request message from either a Time-Sensitive Networking Application Function TSN AF or a Time Sensitive Communication Time Synchronization Function TSCTSF or both on the basis of an exposure service for a UPF event, the subscription request message including Time-Sensitive Communication TSC management information:

perform triggering for subscription to the UPF event on the basis of the TSC management information;

provide a notification message to either the TSN AF or the TSCTSF or both, the notification message including the TSC management information;

obtain the TSC management information from the TSN AF or the TSCTSF;

in response to the obtaining of the TSC management information, provide the TSN AF or the TSCTSF with a request message for subscription or unsubscription to the UPF event; and obtain the notification message from the TSN AF or the TSCTSF.

6. The UPF apparatus of claim 5, wherein the at least one controller is further configured to use the TSC management information as a new UPF event, and the notification message includes a Port Management Information Container PMIC(s), a User Plane Node Management Information Container UMIC, and a related Network-Side TSN Translator NW-TT port number.

7. The UPF apparatus of claim 5, wherein the subscription request message is a message for requesting subscription or unsubscription to the UPF event, and the subscription request message for the UPF event includes at least one selected from a group of an event reporting method, a destination Network Function (NF) address for event reporting, and a request for direct event notification.

8. The UPF apparatus of claim 7, wherein the subscription request message is provided on the basis of a first operation for the exposure service for the UPF event, the notification message is provided on the basis of a second operation for the exposure service for the UPF event, the first operation includes Nupf_EventExposure Subscribe and Nupf_EventExposure_UnSubscribe, and is provided on the basis of at least one selected from a group of an N4 interface between a Session Management Function SMF and a UPF, a Npcf_SMPolicyControl service interface between the SMF and a Policy Control Function (PCF), and a Npef_PolicyAuthorization service interface between the TSN AF/TSCTSF and the PCF, and the second operation includes Nupf_EventExposure_Notify.

\* \* \* \* \*